(12) United States Patent
Alderson

(10) Patent No.: US 7,021,196 B1
(45) Date of Patent: Apr. 4, 2006

(54) STEERING RACK

(76) Inventor: Mark L. Alderson, 4056 Locust La., Brownsburg, IN (US) 46112

( * ) Notice: Subject to any disclaimer, the term of this patent is extended or adjusted under 35 U.S.C. 154(b) by 0 days.

(21) Appl. No.: 10/950,098

(22) Filed: Sep. 24, 2004

Related U.S. Application Data

(60) Provisional application No. 60/505,463, filed on Sep. 24, 2003.

(51) Int. Cl.
F01B 9/00 (2006.01)
(52) U.S. Cl. .................. 92/136; 180/417; 180/428; 74/388 PS; 74/422; 74/89.17; 92/136; 92/169.4; 92/117 A; 92/117 R
(58) Field of Classification Search ................ 180/417, 180/428; 74/388 PS, 422; 92/117 A, 117 R, 92/136, 169.4
See application file for complete search history.

(56) References Cited

U.S. PATENT DOCUMENTS

| 4,085,817 | A | * | 4/1978 | Kervagoret | 180/417 |
| 4,986,382 | A | * | 1/1991 | Harrison | 180/428 |
| 5,419,235 | A | * | 5/1995 | Gilbert et al. | 91/375 R |
| 5,509,493 | A | * | 4/1996 | Lang et al. | 180/417 |
| 5,842,537 | A | * | 12/1998 | Pfeifer | 180/428 |

* cited by examiner

*Primary Examiner*—Lesley D. Morris
*Assistant Examiner*—Marlon Arce-Diaz
(74) *Attorney, Agent, or Firm*—Woodard, Emhardt, Moriarty, McNett & Henry LLP

(57) ABSTRACT

The present invention comprises an improved steering rack in which sliding sleeves within the main cylinder allow a channel to be cut through the main cylinder to allow for passage of the stationary piston attachment pin without allowing hydraulic fluid to leak through the channel.

1 Claim, 6 Drawing Sheets

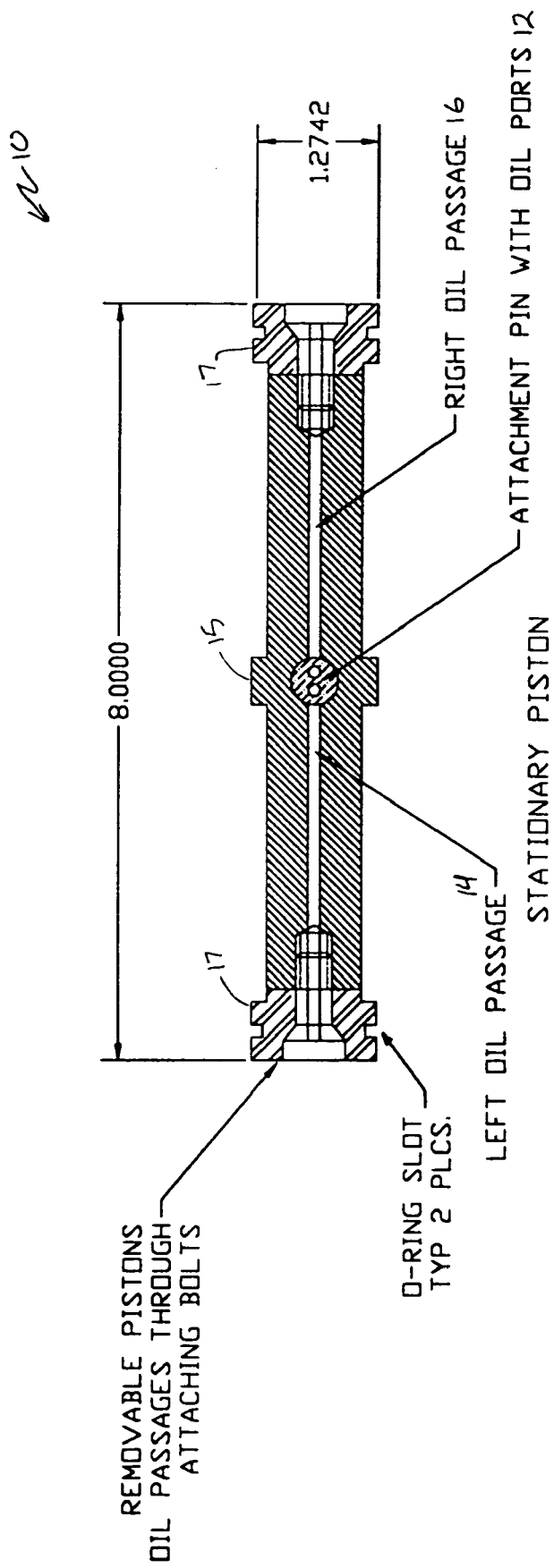

PISTON SLEEVE

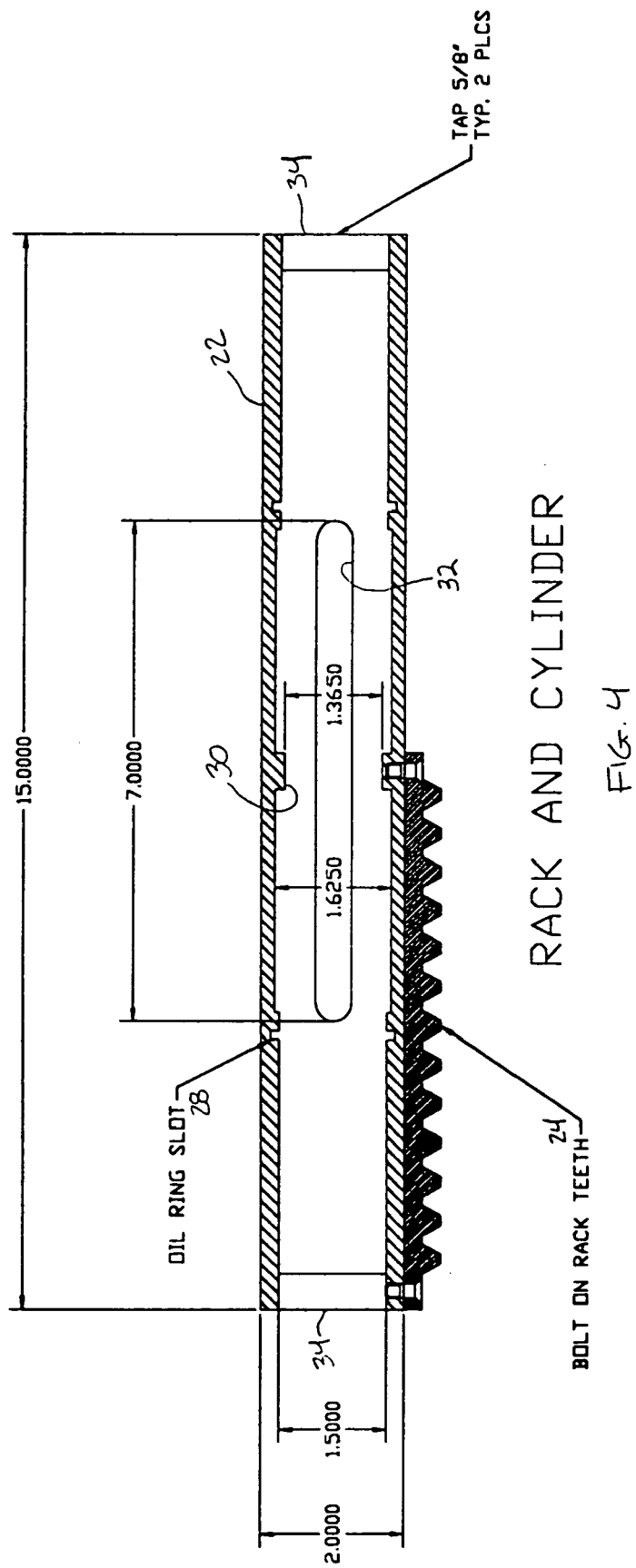

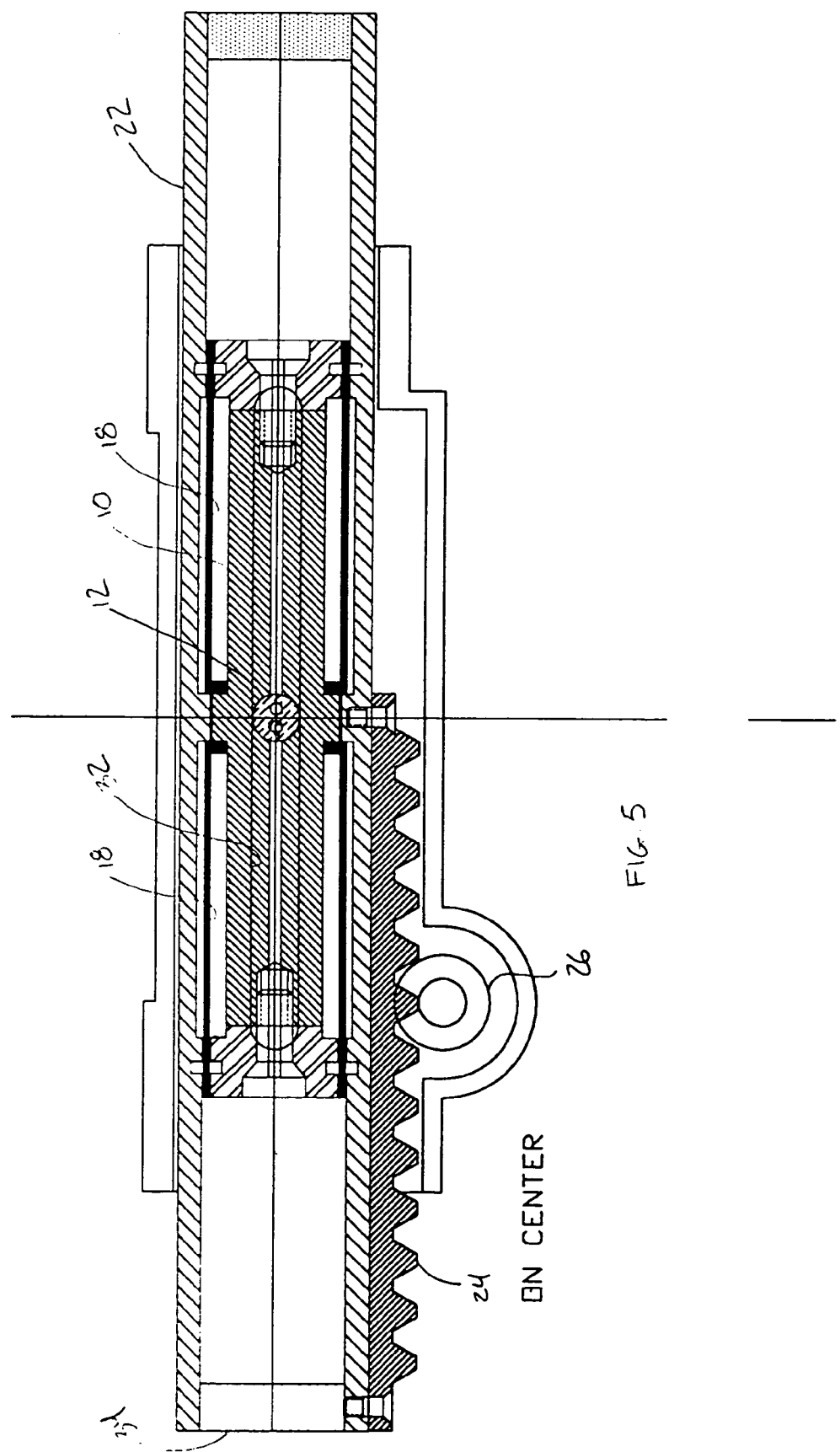

RIGHT LOCK

STEERING RACK

CROSS REFERENCE TO RELATED APPLICATIONS

This application claims the benefit of U.S. Provisional Application No. 60/505,463, filed Sep. 24, 2003.

TECHNICAL FIELD OF THE INVENTION

The present invention generally relates to vehicle steering systems and, more particularly, to a vehicle steering rack.

BACKGROUND OF THE INVENTION

As is known in the art, rack and pinion steering systems with hydraulic power steering assist are commonly used in vehicle steering systems. The steering rack receives mechanical input through a connection with the driver's steering wheel, such that turning of the steering wheel results in movement of the steering rack and corresponding movement of the vehicle wheels. Power assist is provided by actuating a hydraulic fluid pump in response to the steering wheel input provided by the driver such that pressurized hydraulic fluid acts upon one or more pistons within the steering rack in order to decrease the effort required by the driver to move the steering rack.

The present invention relates to an improved steering rack with hydraulic power assist which allows the steering rack to occupy a much smaller space than prior designs.

SUMMARY OF THE INVENTION

The present invention comprises an improved steering rack in which sliding sleeves within the main cylinder allow a channel to be cut through the main cylinder to allow for passage of the stationary piston attachment pin without allowing hydraulic fluid to leak through the channel.

BRIEF DESCRIPTION OF THE DRAWINGS

FIG. 1 is a cross-sectional view of a preferred embodiment stationary piston of the present invention.

FIG. 4 is a cross-sectional view of a preferred embodiment rack and cylinder of the present invention.

FIG. 5 is a cross-sectional view of the steering rack of the present invention in the on-center position.

DETAILED DESCRIPTION OF THE PREFERRED EMBODIMENTS

Figure 3:
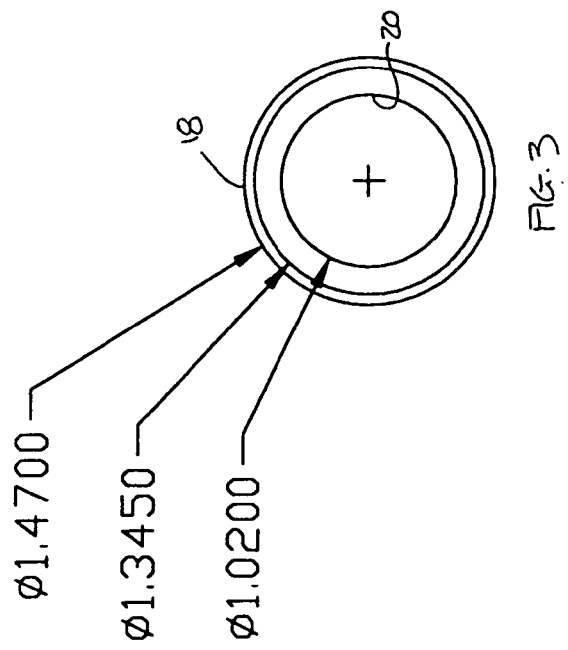
FIG. 3 is an end-elevational view of the piston sleeve of FIG. 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

With reference to FIG. 1, a stationary piston of the present invention is illustrated and indicated generally at 10. The stationary piston 10 has a central attachment pin 12 which has two oil ports formed therein. These oil ports communicate with a longitudinal left oil passage 14 and right oil passage 16 (respectively) formed as central bores through the stationary piston 10. By means of the oil ports formed in the attachment pin 12, hydraulic fluid may be pumped into or out of the oil passages 14, 16 independently of one another, as is known in the art. Each end of the stationary piston 10 includes a piston end cap 17, each having an annular recess for receiving an O-ring seal. Furthermore, stationary piston 10 also includes a raised annular rib 15 formed about its transverse center line.

Figure 2:
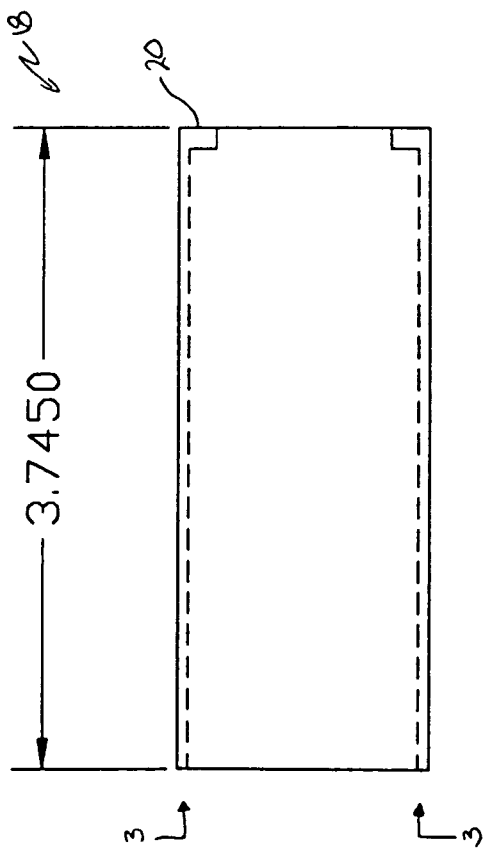
FIG. 2 is a cross-sectional view of a preferred embodiment piston sleeve of the present invention.

FIG. 2 illustrates a piston sleeve 18 of the present invention, which includes a reduced diameter stop 20 at one end. An end-elevational view of the piston sleeve 18 is illustrated in FIG. 3.

Referring now to FIG. 4, there is shown a main cylinder of the steering rack of the present invention, indicated generally at 22. A rack 24 is bolted to the cylinder 22, the rack 24 having a plurality of teeth thereon in order to engage a pinion 26 (see FIGS. 5–7). Main cylinder 22 includes two annular slots 28 formed therein for holding O-ring seals. Cylinder 22 further includes an internal raised annular ridge 30 formed therein. An open slot 32 is formed through the surface of cylinder 22 in order to allow for passage of the attachment pin 12 and provide enough clearance for the cylinder 22 to slide throughout its length of travel without interfering with attachment pin 12. Two end caps 34 seal respective ends of the cylinder 22.

FIG. 5 shows a cross-sectional view of the steering rack of the present invention assembled and positioned at the on-center position. As can be seen, a piston sleeve 18 is sleeved over both the left and right halves of the stationary piston 10. This subassembly is then sleeved within the main cylinder 22 as shown. As will be appreciated from the drawings and the following description, the channel 32 and the piston sleeves 18 allow the main cylinder 22 to slide back and forth without interfering with the attachment pin 12 or allowing hydraulic fluid to escape from the main cylinder 22.

Figure 6:
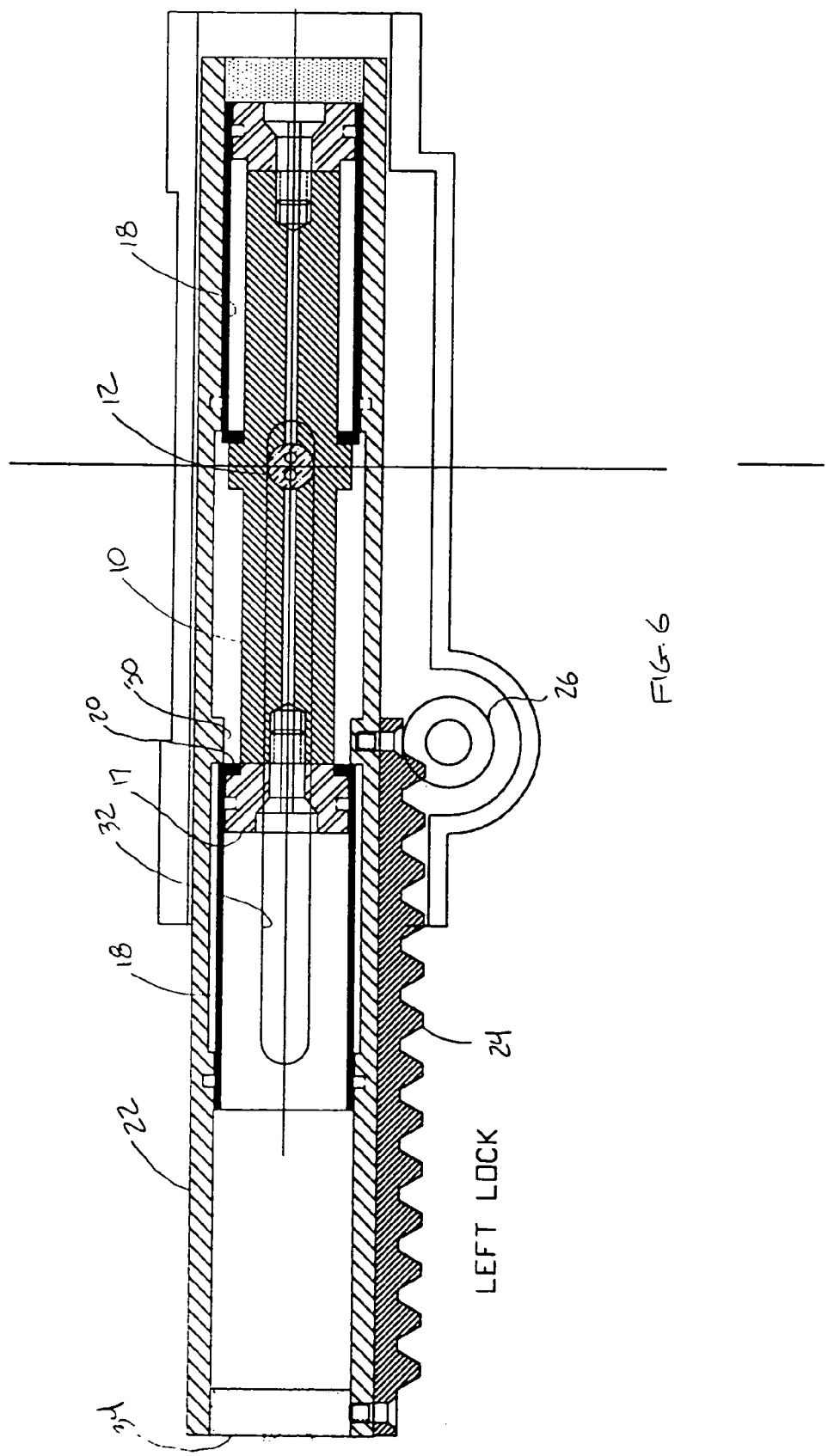
FIG. 6 is a cross-sectional view of the steering rack of the present invention in the left lock position.

With particular reference now to FIG. 6, turning the vehicle steering wheel to the left will result in pinion 26 engaging the teeth of rack 24 in order to move the main cylinder 22 to the left with respect to stationary piston 10. In concert with this action, as is known in the art, the power steering assist system will supply hydraulic fluid under pressure to the attachment pin 12 such that fluid is pumped into the left oil passage 14. Correspondingly, the attachment pin 12 will allow hydraulic fluid to be drained from right oil passage 16. As the main cylinder moves to the left, the raised annular portion 30 interferes with the annular indentation 20 of the left piston sleeve 18 and pushes the left piston sleeve 18 along the surface of stationary piston 10 until the annular flange 20 engages the left piston cap 17. Because the left piston cap 17 prevents further movement of the main cylinder 22 and left piston sleeve 18, this serves as the left lock stop of the steering rack. As can be seen, the channel 32 allows clearance for the main cylinder 22 to slide with respect to the attachment pin 12 without interference between the two. Meanwhile, the left piston sleeve 18, acting against the O-ring seals in the slot 28 and the end cap 17, prevents any leakage of hydraulic fluid through the lefthand portion of the channel 32 that would otherwise be exposed to the left of the stationary piston 10.

Figure 7:
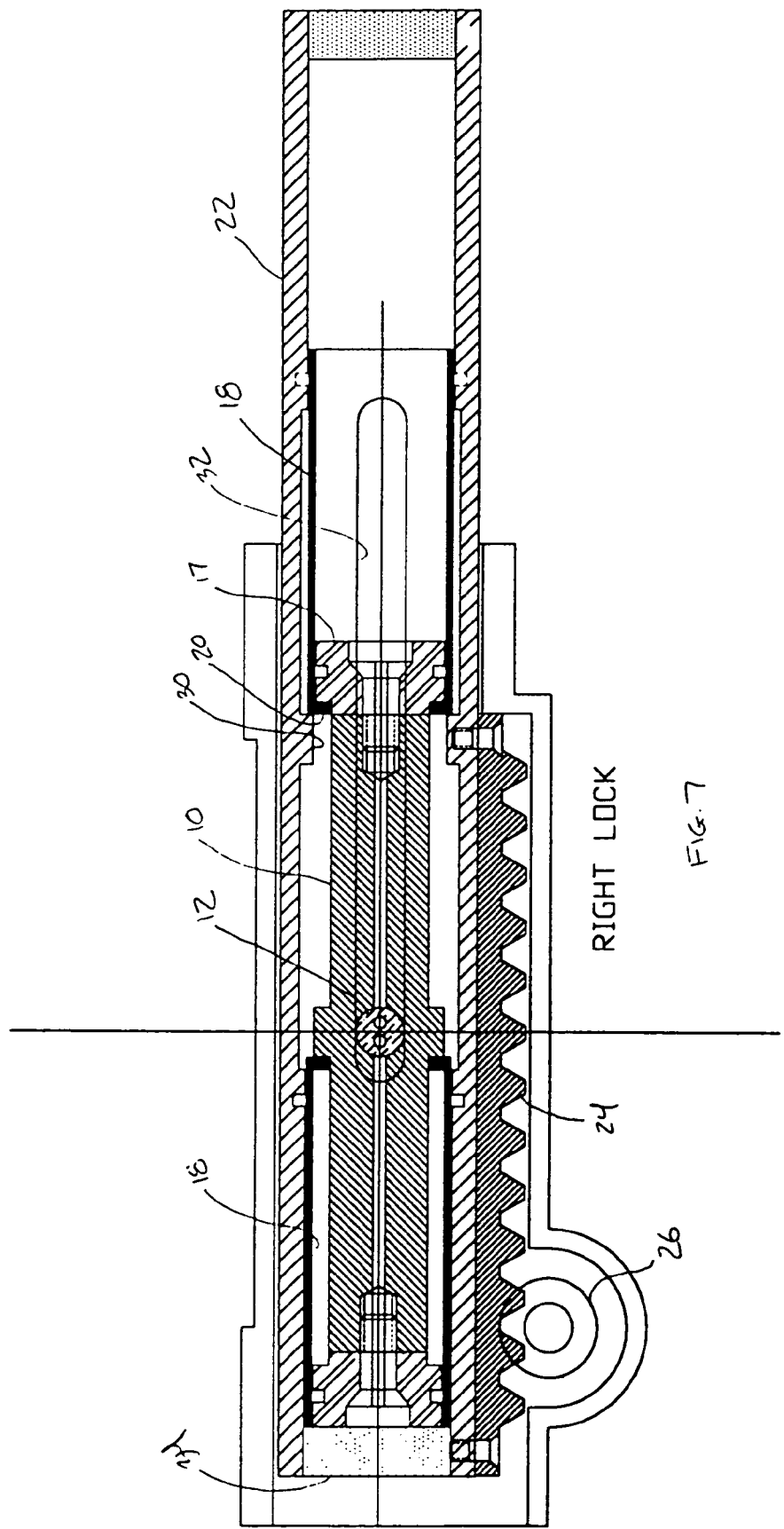
FIG. 7 is a cross-sectional view of the steering rack of the present invention in the right lock position.

With reference now to FIG. 7, the steering rack of the present invention is illustrated in the right lock position. As described above, turning the vehicle steering wheel to the right causes the pinion 26 to interact with the rack 24 in order to drive the main cylinder 22 to the right with respect to the stationary piston 10. At the same time, the hydraulic power assist system will pump hydraulic fluid under pressure through the attachment pin 12 into the right oil passage 16, while allowing hydraulic fluid to drain from the left side of stationary piston 10 through the other port of the attachment pin 12. Movement of the main cylinder 22 in this direction causes the annular flange 30 of the main cylinder 22 to push against the annular flange 20 of the right piston sleeve 18, thereby causing the right piston sleeve 18 to move to the right with respect to stationary piston 10. This movement continues until the annular flange 20 of right piston sleeve 18 engages the right end cap 17, which serves as the right lock stop for the steering rack. As can be seen from the drawing, movement of the main cylinder 22 to the right eventually results in the left end cap 34 engaging the left piston sleeve 18. Further travel of the main cylinder 22 to the right causes the left piston sleeve 18 to be moved to the right of stationary piston 10. As was the case with respect to the left turn discussed hereinabove, the channel 32 in main cylinder 22 allows clearance for the main cylinder 22 to move with respect to the attachment pin 12. Also, the piston sleeves 18, cooperating with the O-ring seals in the main cylinder 22 and the end cap 17, prevent hydraulic fluid from reaching the channel 32.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A steering rack for a vehicle, the steering rack comprising:
    a main cylinder having a main cylinder interior and a main cylinder exterior;
    a plurality of rack teeth coupled to the main cylinder exterior;
    a pinion gear engaging at least one of the plurality of rack teeth;
    a stationary piston having a stationary piston left half and a stationary piston right half, the stationary piston disposed within the main cylinder;
    an attachment pin extending through the main cylinder and attached to the stationary piston, the attachment pin adapted to allow flow of fluid therethrough;
    a first piston sleeve disposed inside the main cylinder and further disposed over the stationary piston left half; and
    a second piston sleeve disposed inside the main cylinder and further disposed over the stationary piston right half.

* * * * *